United States Patent Office 2,921,060
Patented Jan. 12, 1960

2,921,060

POLYMERIZATION OF ETHYLENE WITH A CERIUM ACETYLACETONATE-METAL ALKYL CATALYST

Archibald P. Stuart, Yeadon, Pa., assignor to Sun Oil Company, Philadelphia, Pa., a corporation of New Jersey No Drawing. Application July 12, 1956
Serial No. 597,336

3 Claims. (Cl. 260—94.9)

This invention relates to the preparation of polymers of normally gaseous olefins and specifically relates to the preparation of solid polymers of ethylene and propylene.

An object of the present invention is to provide a low temperature, low pressure process for the preparation of solid polymers of normally gaseous olefins. A specific object of the invention is to provide a process for the preparation of solid polymers of ethylene. Another specific object is to provide a process for the preparation of solid polymers of propylene. A further specific object is to provide a process for the preparation of solid copolymers of ethylene and propylene.

It has now been found that by contacting a normally gaseous olefin, under polymerizing conditions, with a reaction mixture prepared by admixing a liquid, substantially inert organic reaction medium, a hydrocarbon soluble compound of a rare earth metal such as a beta-metal chelate compound wherein the metal is a rare earth metal, and a metal alkyl compound wherein the metal is aluminum, magnesium, lithium, lead or zinc, the normally gaseous olefin is rapidly polymerized to solid polymers.

In an embodiment of the invention, aluminum triethyl and cerium acetylacetonate are admixed in isooctane. A finely divided precipitate is formed in the isooctane which is apparently a complex formed by interaction between added materials. The temperature of the reaction mixture is adjusted to about 100° C. and ethylene bubbled into the mixture. A white, finely divided precipitate of solid polymers of ethylene are formed in the reaction mixture. The so-formed polymers are separated from the reaction mixture and form a polymer product of the invention.

Ethylene, propylene and mixtures of ethylene and propylene are the feed stocks in the present process. Accordingly, the products of the invention are polymers of ethylene, polymers of propylene, or copolymers of ethylene and propylene. The normally gaseous olefin, or a mixture of such olefins, can be from any source such as from refinery streams, the dehydration of alcohol, the dehydrogenation of parafins, and the like. The presence of a small amount of saturated hydrocarbons, such as ethane, propane, and butane, is not deleterious. Also, other olefins such as butenes, butadiene, pentenes and styrene can be present in an amount up to about 25% by weight of the normally gaseous olefin employed and good results obtained. Such other olefins appear to form copolymers with the normally gaseous olefin and such copolymers form useful products as hereinafter described.

Hydrocarbon soluble compounds of rare earth metals used in preparing the reaction medium of the process are preferably beta-metal chelate compounds formed between a rare earth metal and a beta-ketone which has the structure:

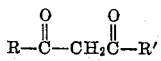

wherein R is an alkyl, cycloalkyl, aryl or aromatic radical, or a substituted derivative thereof, and wherein R' is hydrogen or an alkyl, cycloalkyl, aryl or aromatic radical, or a substituted derivative thereof. When R' is a hydrocarbon radical, it may be the same as, or different from, R. R may, for example, be a methyl, ethyl, propyl isopropyl, butyl, cyclohexyl, methylcyclohexyl, phenyl, or tolyl radical, and R' may be the same as R or a different radical such as described for R. Cerium acetylacetonate, scandium acetylacetonate, and praseodymium acetylacetonate are the preferred beta-metal chelates to use, but the corresponding beta-chelates of lanthanum, yttrium and neodymium give good results. The corresponding chelates of 1,3-hexanedione and 3,5-nonanedione also give good results. Other hydrocarbon soluble compounds of the rare earth metals, such as salts of naphthenic or aliphatic acids, can be used, and by "hydrocarbon soluble compounds" is meant compounds which are soluble, at least within the concentration ranges herein defined, in hydrocarbon solvents as defined herein for use as the organic reaction medium. Beta-metal chelate compounds, as above defined, are preferred for use in the process, and hence for simplicity the invention is principally described hereinafter as using such compounds.

The metal alkyl compound to use is an alkyl derivative of aluminum, magnesium, lithium, lead or zinc. Aluminum triethyl, aluminum triisopropyl, aluminum triisobutyl and the magnesium and zinc analogues thereof give good results in the process and are preferred.

The components of the reaction mixture, i.e., the beta-metal chelate and the metal alkyl, are admixed in a liquid, substantially inert organic reaction medium. During the admixing vigorous agitation should be used. There is formed in the reaction mixture a finely divided precipitate which is apparently a complex between the two added components. This finely divided precipitate forms a slurry in the reaction medium and is the catalyst of the process of the invention. The mole ratio of metal alkyl to beta-metal chelate can be varied within the range of from 0.5:1 to 10:1 and good results obtained, but preferably the mole ratio is maintained within the range of from 1:1 to 6:1.

The organic reaction medium to employ must be liquid and substantially inert under the conditions used. Saturated hydrocarbons, including paraffins such as the pentanes, hexanes, octanes, decanes, and mixtures thereof, and cycloparaffins, such as cyclopentane, alkyl substituted cyclopentanes, cyclohexane, alkyl substituted cyclohexanes, decalin, mixtures thereof with each other and with paraffins give good results and are preferred. Aromatic hydrocarbon such as benzene, toluene, xylene, and the like can also be used with good results and inert ethers, such as diethylether, can be used in some instances with good results. The quantity of organic reaction medium to employ can be varied widely and good results obtained. Generally, a quantity sufficient to form a light slurry of the solid catalyst particles is used, which amount is advantageously from about 5 to 1,000 volumes or more, based on the volume of the solid catalyst phase.

The finely divided precipitate formed by the reaction between the beta-metal chelate and metal alkyl can be separated from the organic reaction medium and redispersed in a different medium if desired. This, however, is generally unnecessary and is not preferred.

The olefins can be introduced into the reaction mixture in liquid or gas phase, or dissolved in a solvent therefor, in which case the solvent is advantageously the same material as the organic reaction medium of the reaction mixture. The pressure can be from subatmospheric to 1,000 atmospheres or more, but it is preferred to employ a pressure of from atmospheric to about 55 atmospheres since the olefins are substantially soluble in the reaction medium under these pressure conditions and since a pressure above about 55 atmospheres does not appear to enhance the rate of reaction or the properties of the polymer product. The temperature of the reaction mixture during the polymerization step is preferably from about 0° C. to 250° C. since good results are obtained in this temperature range. Such reaction conditions are herein conveniently designated as "polymerization conditions." The process should be performed to exclude moisture and air, as above described.

After completion of the polymerization reaction, as indicated by lack of ethylene consumption by the reaction mixture, the reaction mixture containing the polymer is treated to deactivate and at least partially remove catalyst therefrom. This can be accomplished by washing with an alcoholic solution of hydrogen chloride, and then with an alcohol such as methanol. If necessary or desirable, washing can be accomplished by means which also comminute the polymer. The alcohol is removed such as by evaporation to obtain the polymer products of the invention. Other means of catalyst deactivation and removal can be used if desired, such as by washing with a mineral acid followed by washing with water and drying.

The following specific embodiment illustrates the invention in which "parts" refers to parts by weight unless otherwise indicated.

To 400 parts of isooctane is added 1.9 parts of cerium acetylacetonate. A quantity of aluminum triethyl sufficient to give a mole ratio of the beta-metal chelate to aluminum triethyl of 1:5 is then added with vigorous agitation. A finely divided precipitate is formed and appears as a slurry in the isooctane. The temperature of the resulting slurry is adjusted to 110° C. and ethylene bubbled into the reaction mixture at a rate of about 20 parts per hour, a pressure of about 100 p.s.i.g. (pounds per square inch gauge) being maintained. After about 4 hours, the rate of ethylene adsorbed to the reaction mixture decreases appreciably. The reaction is stopped and about 200 parts of methanol containing hydrogen chloride added still with continuous stirring. The polymer is then filtered, washed with methanol and dried. There is recovered a white finely divided polymer product having a molecular weight of about 20,000.

When other beta-metal chelates and other metal alkyls within the limits above described are used, substantially equivalent results are obtained.

The polymer products of the invention can vary from waxy solids having molecular weights of from about 300 to 800 to hard, resinous solids having molecular weights of above about 100,000. Such polymer products are useful for the preparation of articles of manufacture such as thin flexible sheets for wrapping food products, containers for corrosive liquids, pipes for conducting liquids, and the like. Such articles are advantageously prepared by extrusion, or molding processes or by other fabrication means.

The invention claimed is:

1. Process for polymerizing ethylene which comprises introducing, under polymerizing conditions, ethylene into a reaction medium prepared by admixing a liquid substantially inert organic reaction medium, cerium acetylacetonate, and a metal alkyl wherein the metal is selected from the group consisting of aluminum, magnesium, lithium, lead, and zinc.

2. Process as defined by claim 1 wherein the metal alkyl is an aluminum alkyl.

3. Process as defined by claim 1 wherein the metal alkyl is aluminum triethyl.

References Cited in the file of this patent

FOREIGN PATENTS 533,362    Belgium _____ May 16, 1955

OTHER REFERENCES

Inorganic Chemistry, by Moeller, John Wiley and Sons, 1952, pages 868, 892, 894 and 895 pertinent.